US008750126B2

(12) United States Patent
McCann et al.

(10) Patent No.: US 8,750,126 B2
(45) Date of Patent: Jun. 10, 2014

(54) METHODS, SYSTEMS, AND COMPUTER READABLE MEDIA FOR MULTI-INTERFACE MONITORING AND CORRELATION OF DIAMETER SIGNALING INFORMATION

(75) Inventors: Thomas M. McCann, Raleigh, NC (US); Mahesh Tomar, Morrisville, NC (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 580 days.

(21) Appl. No.: 13/026,133

(22) Filed: Feb. 11, 2011

(65) Prior Publication Data

US 2011/0188397 A1 Aug. 4, 2011

Related U.S. Application Data

(63) Continuation-in-part of application No. 12/906,816, filed on Oct. 18, 2010.

(60) Provisional application No. 61/252,557, filed on Oct. 16, 2009, provisional application No. 61/304,310, filed on Feb. 12, 2010.

(51) Int. Cl.
*H04L 12/26* (2006.01)
*H04L 12/28* (2006.01)
*H04J 1/14* (2006.01)

(52) U.S. Cl.
USPC ........... 370/236; 370/426; 370/496; 370/522; 709/223

(58) Field of Classification Search
USPC ................ 370/229–240, 310–350, 384–385, 370/400–401, 410, 426, 461–463, 496, 370/522–525; 455/446–466; 709/223–231
See application file for complete search history.

(56) References Cited

U.S. PATENT DOCUMENTS

| | | | |
|---|---|---|---|
| 4,310,727 A | 1/1982 | Lawser | |
| 4,754,479 A | 6/1988 | Bicknell et al. | |
| 5,089,954 A | 2/1992 | Rago | |
| 5,228,083 A | 7/1993 | Lozowick et al. | |

(Continued)

FOREIGN PATENT DOCUMENTS

| | | |
|---|---|---|
| CA | 2 716 544 A1 | 12/2010 |
| EP | 0 512 962 A2 | 11/1992 |

(Continued)

OTHER PUBLICATIONS

Final Official Action for U.S. Appl. No. 13/026,105 (Nov. 26, 2012).

(Continued)

*Primary Examiner* — Tri H Phan
(74) *Attorney, Agent, or Firm* — Jenkins, Wilson, Taylor & Hunt, P.A.

(57) ABSTRACT

According to one aspect, the subject matter described herein includes a method for multi-interface monitoring and correlation of Diameter signaling information. The method includes copying Diameter information from a first signaling message traversing a first signaling interface. The method further includes copying information from a second signaling message traversing a second signaling interface. The method further includes correlating the Diameter information from the first signaling message with the information from the second signaling message and storing the correlated information in a memory device.

24 Claims, 8 Drawing Sheets

(56) References Cited

U.S. PATENT DOCUMENTS

| | | |
|---|---|---|
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,719,861 A | 2/1998 | Okanoue |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichani et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,157,621 A | 12/2000 | Brown et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,273,622 B1 | 8/2001 | Ben-David |
| 6,304,273 B1 | 10/2001 | Bonnet |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,584,073 B1 | 6/2003 | Steele, Jr. et al. |
| 6,594,258 B1 | 7/2003 | Larson et al. |
| 6,611,516 B1 | 8/2003 | Pirkola et al. |
| 6,643,511 B1 | 11/2003 | Hu et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,546 B2 | 9/2004 | Delaney et al. |
| 6,795,701 B1 | 9/2004 | Hui et al. |
| 6,819,652 B1 | 11/2004 | Aravamudhan et al. |
| 6,839,421 B2 | 1/2005 | Ferraro Esparza et al. |
| 6,865,153 B1 | 3/2005 | Hill et al. |
| 6,871,070 B2 | 3/2005 | Ejzak |
| 6,915,345 B1 | 7/2005 | Tummala et al. |
| 6,917,612 B2 | 7/2005 | Foti et al. |
| 6,918,041 B1 | 7/2005 | Chen |
| 6,950,441 B1 | 9/2005 | Kaczmarczyk et al. |
| 6,954,790 B2 | 10/2005 | Forslöw |
| 6,967,956 B1 | 11/2005 | Tinsley et al. |
| 7,010,002 B2 | 3/2006 | Chow et al. |
| 7,027,582 B2 | 4/2006 | Khello et al. |
| 7,042,877 B2 | 5/2006 | Foster et al. |
| 7,043,000 B2 | 5/2006 | Delaney et al. |
| 7,079,499 B1 | 7/2006 | Akhtar et al. |
| 7,079,524 B2 | 7/2006 | Bantukul et al. |
| 7,079,853 B2 | 7/2006 | Rathnasabapathy et al. |
| 7,136,635 B1 | 11/2006 | Bharatia et al. |
| 7,170,982 B2 | 1/2007 | Li et al. |
| 7,221,952 B2 | 5/2007 | Cho et al. |
| 7,257,636 B2 | 8/2007 | Lee et al. |
| 7,286,516 B2 | 10/2007 | Delaney et al. |
| 7,286,839 B2 | 10/2007 | McCann et al. |
| 7,292,592 B2 | 11/2007 | Rune |
| 7,298,725 B2 | 11/2007 | Rune |
| 7,333,438 B1 | 2/2008 | Rabie et al. |
| 7,333,482 B2 | 2/2008 | Johansson et al. |
| 7,383,298 B2 | 6/2008 | Palmer et al. |
| 7,403,492 B2 | 7/2008 | Zeng et al. |
| 7,403,537 B2 | 7/2008 | Allison et al. |
| 7,466,807 B2 | 12/2008 | McCann et al. |
| 7,551,926 B2 | 6/2009 | Rune |
| 7,567,796 B2 | 7/2009 | Tammi et al. |
| 7,583,963 B2 | 9/2009 | Tammi et al. |
| 7,590,732 B2 | 9/2009 | Rune |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,792,981 B2 | 9/2010 | Taylor |
| 7,822,023 B2 | 10/2010 | Lahetkangas et al. |
| 7,894,353 B2 | 2/2011 | Li et al. |
| 7,898,957 B2 | 3/2011 | Lea et al. |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,041,021 B2 | 10/2011 | Xu et al. |
| 8,045,983 B2 | 10/2011 | Bantukul |
| 8,170,035 B2 | 5/2012 | Furey et al. |
| 8,170,055 B2 | 5/2012 | Fang et al. |
| 8,219,697 B2 * | 7/2012 | Langen et al. ............... 709/230 |
| 8,468,267 B2 * | 6/2013 | Yigang et al. ............... 709/241 |
| 8,478,828 B2 | 7/2013 | Craig et al. |
| 8,483,233 B2 | 7/2013 | Craig et al. |
| 8,498,202 B2 | 7/2013 | Kanode et al. |
| 8,504,630 B2 * | 8/2013 | Craig et al. ............... 709/206 |
| 8,527,598 B2 | 9/2013 | Craig et al. |
| 8,532,110 B2 | 9/2013 | McCann et al. |
| 8,547,908 B2 | 10/2013 | Marsico |
| 8,554,928 B2 | 10/2013 | Craig et al. |
| 8,578,050 B2 | 11/2013 | Craig et al. |
| 8,601,073 B2 | 12/2013 | Craig et al. |
| 8,613,073 B2 | 12/2013 | McCann et al. |
| 2001/0024443 A1 | 9/2001 | Alriksson et al. |
| 2001/0030957 A1 | 10/2001 | McCann et al. |
| 2001/0040957 A1 | 11/2001 | McCann et al. |
| 2002/0049901 A1 | 4/2002 | Carvey |
| 2002/0051427 A1 | 5/2002 | Carvey |
| 2002/0087723 A1 | 7/2002 | Williams et al. |
| 2002/0133494 A1 | 9/2002 | Goedken |
| 2002/0133534 A1 | 9/2002 | Forslow |
| 2002/0141346 A1 | 10/2002 | Garcia-Luna-Aceves et al. |

(56) References Cited

U.S. PATENT DOCUMENTS

| | | |
|---|---|---|
| 2002/0147845 A1 | 10/2002 | Sanchez-Herrero et al. |
| 2002/0173320 A1 | 11/2002 | Aitken et al. |
| 2002/0181507 A1 | 12/2002 | Jones |
| 2003/0007482 A1 | 1/2003 | Khello et al. |
| 2003/0026289 A1 | 2/2003 | Mukherjee et al. |
| 2003/0081754 A1 | 5/2003 | Esparza et al. |
| 2003/0095536 A1 | 5/2003 | Hu et al. |
| 2003/0109271 A1 | 6/2003 | Lewis et al. |
| 2003/0115358 A1 | 6/2003 | Yun |
| 2003/0193967 A1 | 10/2003 | Fenton et al. |
| 2003/0225938 A1 | 12/2003 | Glasco et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0037278 A1 | 2/2004 | Wong et al. |
| 2004/0042485 A1 | 3/2004 | Gettala et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0098612 A1 | 5/2004 | Lee et al. |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0246965 A1 | 12/2004 | Westman et al. |
| 2005/0002417 A1 | 1/2005 | Kelly et al. |
| 2005/0099964 A1 | 5/2005 | Delaney et al. |
| 2005/0232236 A1 | 10/2005 | Allison et al. |
| 2005/0232407 A1 | 10/2005 | Craig et al. |
| 2005/0235065 A1 | 10/2005 | Le et al. |
| 2005/0246545 A1 | 11/2005 | Reiner |
| 2005/0246716 A1 | 11/2005 | Smith et al. |
| 2006/0045249 A1 | 3/2006 | Li et al. |
| 2006/0067338 A1 | 3/2006 | Hua et al. |
| 2006/0077926 A1 | 4/2006 | Rune |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0136557 A1 | 6/2006 | Schaedler et al. |
| 2006/0172730 A1 | 8/2006 | Matsuda |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0253563 A1 | 11/2006 | Yang et al. |
| 2006/0274744 A1 | 12/2006 | Nagai et al. |
| 2007/0047539 A1 | 3/2007 | Agarwal et al. |
| 2007/0076600 A1 | 4/2007 | Ekl et al. |
| 2007/0153995 A1 | 7/2007 | Fang et al. |
| 2007/0168421 A1 | 7/2007 | Kalyanpur et al. |
| 2007/0214209 A1 | 9/2007 | Maeda |
| 2007/0280447 A1 | 12/2007 | Cai et al. |
| 2007/0297419 A1 | 12/2007 | Askerup et al. |
| 2008/0025230 A1 | 1/2008 | Patel et al. |
| 2008/0039104 A1 | 2/2008 | Gu et al. |
| 2008/0043614 A1 | 2/2008 | Soliman |
| 2008/0144602 A1 | 6/2008 | Casey |
| 2008/0160954 A1 | 7/2008 | Agarwal et al. |
| 2008/0167035 A1 | 7/2008 | Buckley et al. |
| 2008/0212576 A1 | 9/2008 | O'Neill |
| 2008/0301162 A1 | 12/2008 | Wall et al. |
| 2008/0317247 A1 | 12/2008 | Jeong et al. |
| 2009/0080410 A1 | 3/2009 | Aoyagi et al. |
| 2009/0080440 A1 | 3/2009 | Balyan et al. |
| 2009/0083861 A1 | 3/2009 | Jones |
| 2009/0129271 A1 | 5/2009 | Ramankutty et al. |
| 2009/0138619 A1 | 5/2009 | Schnizlein et al. |
| 2009/0185494 A1 | 7/2009 | Li et al. |
| 2009/0193071 A1 | 7/2009 | Qiu et al. |
| 2009/0232011 A1 | 9/2009 | Li et al. |
| 2009/0319686 A1 | 12/2009 | Watanabe |
| 2010/0017846 A1 | 1/2010 | Huang et al. |
| 2010/0042525 A1 | 2/2010 | Cai et al. |
| 2010/0135287 A1 | 6/2010 | Hosain et al. |
| 2010/0177780 A1 | 7/2010 | Ophir et al. |
| 2010/0251330 A1 | 9/2010 | Kroeselberg et al. |
| 2010/0265948 A1 | 10/2010 | Patel et al. |
| 2010/0299451 A1* | 11/2010 | Yigang et al. ............... 709/241 |
| 2011/0014939 A1 | 1/2011 | Ravishankar et al. |
| 2011/0060830 A1 | 3/2011 | Kang et al. |
| 2011/0116378 A1 | 5/2011 | Ramankutty et al. |
| 2011/0116382 A1 | 5/2011 | McCann et al. |
| 2011/0126277 A1 | 5/2011 | McCann et al. |
| 2011/0199895 A1 | 8/2011 | Kanode et al. |
| 2011/0199906 A1 | 8/2011 | Kanode et al. |
| 2011/0200047 A1 | 8/2011 | McCann et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1* | 8/2011 | Craig et al. ............... 709/206 |
| 2011/0202614 A1 | 8/2011 | Graig et al. |
| 2011/0202676 A1 | 8/2011 | Craig et al. |
| 2011/0202677 A1 | 8/2011 | Craig et al. |
| 2011/0202684 A1 | 8/2011 | Craig et al. |
| 2011/0225280 A1 | 9/2011 | Delsesto et al. |
| 2011/0225281 A1* | 9/2011 | Riley et al. ............... 709/223 |
| 2011/0225306 A1 | 9/2011 | Delsesto et al. |
| 2011/0302244 A1 | 12/2011 | McCann et al. |
| 2011/0314178 A1 | 12/2011 | Kanode et al. |
| 2012/0155389 A1 | 6/2012 | McNamee et al. |
| 2012/0191847 A1 | 7/2012 | Nas et al. |
| 2012/0224524 A1 | 9/2012 | Marsico |
| 2013/0039176 A1* | 2/2013 | Kanode et al. ............... 370/230 |

FOREIGN PATENT DOCUMENTS

| | | |
|---|---|---|
| EP | 0 936 825 A3 | 8/1999 |
| EP | 0 944 276 A1 | 9/1999 |
| EP | 1 134 939 A1 | 9/2001 |
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 2004/006534 A1 | 1/2004 |
| WO | WO 2004/075507 A2 | 9/2004 |
| WO | WO 2007/045991 A1 | 4/2007 |
| WO | WO 2008/087633 A2 | 7/2008 |
| WO | WO 2009/058067 A1 | 5/2009 |
| WO | WO 2009/070179 A1 | 6/2009 |
| WO | WO 2009/128837 A1 | 10/2009 |
| WO | WO 2009/134265 A1 | 11/2009 |
| WO | WO 2011/047382 A2 | 4/2011 |
| WO | WO 2011/100587 A2 | 8/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100626 A2 | 8/2011 |
| WO | WO 2011/100629 A2 | 8/2011 |
| WO | WO 2011/100630 A2 | 8/2011 |
| WO | WO 2012/010057 A2 | 7/2012 |
| WO | WO 2012/119147 A1 | 9/2012 |

OTHER PUBLICATIONS

Non-Final Official Action for U.S. Appl. No. 13/026,153 (Nov. 6, 2012).

Non-Final Official Action for U.S. Appl. No. 13/412,352 (Oct. 26, 2012).

Non-Final Official Action for U.S. Appl. No. 13/026,144 (Oct. 16, 2012).

Non-Final Official Action for U.S. Appl. No. 13/026,098 (Sep. 20, 2012).

(56) References Cited

OTHER PUBLICATIONS

Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Traffix Systems, "Datasheet; Traffix Signaling Delivery Controller (SDC)," pp. 1-5 (May 2011).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Final Official Action for U.S. Appl. No. 12/906,816 (Feb. 21, 2012).
Applicant-Initiated Interview Summary for U.S. Appl. No. 12/906,816 (Jan. 27, 2012).
Notification of Transmittal of the International Search Report and the Written Opinion of the International Searching Authority, or the Declaration for International Application No. PCT/US2011/0246622 (Oct. 31, 2011).
Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/U52011/024621 (Oct. 28, 2011).
Notification of Transmittal of the International Search Report and the Written Opinion of the International Searching Authority, or the Declaration for International Application No. PCT/U52011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Autority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet Systems (EPS)," Network Working Group, RFC 5516, pp. 1-5 (Apr. 2009).
Notification of Transmittal of the International Search Report and the Wreitten Opinion of the International Searching Authority, or the Declaration for International Application No. PCT/US2010/053062 (Jun. 28, 2011).
Znaty, "Diameter, CPRS, (LTE + ePCT = EPS), MS. PCC and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, B.9.2.0, pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Singalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Unsername and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V.9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).

(56) References Cited

OTHER PUBLICATIONS

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V830 (Sep. 2009).
"3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).

"3rd Generation Partnership Project; Technical Specification Group Core Network and Terminals; Evolved Packet System (EPS); Mobility Management Entity) (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
"Diameter Overview," referenced from www.ulticom.com/html/products/signalware-diameter-reference-guide.asp (Publication Date Unknown).
Notice of Allowance and Fee(s) Due for U.S. Appl. No. 13/026,162 (Dec. 19, 2012).
Final Official Action for U.S. Appl. No. 13/026,076 (Dec. 7, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).

(56) References Cited

OTHER PUBLICATIONS

Extended European Search Report for European Application No. 11742905.0 (Dec. 11, 2013).
Extended European Search Report for European Application No. 11742894.6 (Dec. 3, 2013).
Non-Final Office Action for U.S. Appl. No. 12/906,816 (Oct. 1, 2013).
Notice of Allowance and Fee(s) Due for U.S. Appl. No. 13/026,060 (Sep. 25, 2013).
Commony-Assigned, Co-Pending U.S. Continuation Patent Application U.S. Appl. No. 14/016,000 titled "Methods, Systems, and Computer Readable Media for Answer-Based Routing of Diameter Request Messages," (unpublished, filed Aug. 30, 2013).
Non-Final Office Action for U.S. Appl. No. 13/026,125 (Aug. 30, 2013).
Commony-Assigned, Co-Pending U.S. Continuation Patent Application U.S. Appl. No. 13/932,608 titled "Methods, Systems, and Computer Readable Media for Inter-Diameter-Message Processor Routing," (unpublished, filed Jul. 1, 2013).
Notice of Allowance and Fee(s) Due for for U.S. Appl. No. 13/026,076 (Jun. 27, 2013).
Restriction Requirement for U.S. Appl. No. 13/026,125 (Jun. 11, 2013).
Notice of Allowance and Fee(s) Due for U.S. Appl. No. 13/026,081 (Jun. 5, 2013).
Notice of Allowance and Fee(s) Due for U.S. Appl. No. 13/026,031 (May 30, 2013).
Notice of Allowance and Fee(s) Due for U.S. Appl. No. 13/412,352 (May 28, 2013).
Interview Summary for U.S. Appl. No. 13/026,098 (May 23, 2013).
Final Office Action for U.S. Appl. No. 13/026,060 (May 10, 2013).
Notice of Allowance and Fee(s) Due for U.S. Appl. No. 13/026,144 (May 1, 2013).
Notice of Allowance and Fee(s) Due for U.S. Appl. No. 13/026,112 (Apr. 26, 2013).
Notice of Allowance and Fee(s) Due for U.S. Appl. No. 13/026,153 (Apr. 15, 2013).
Notice of Allowance and Fee(s) Due for U.S. Appl. No. 13/026,162 (Apr. 1, 2013).
Supplemental Notice of Allowability for U.S. Appl. No. 13/026,031 (Mar. 22, 2013).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Tsou et al., "Diameter Routing Extensions," draft-tsou-dime-base-routing-ext-04, Internet-Draft, pp. 1-28 (Jul. 29, 2008).
Ravikumar et al., "Star-Graph Based Multistage Interconnection Network for ATM Switch Fabric," Parallel and Distributed Processing, pp. 1-8 (Oct. 26, 1994).
Communication of European Publication Number and Information on the Application of Article 67(3) EPC for European Patent Application No. 12737038.5 (Oct. 30, 2013).
Notice of Allowance and Fee(s) Due for U.S. Appl. No. 12/906,998 (Jul. 31, 2013).
Non-Final Office Action for U.S. Appl. No. 12/906,998 (Jan. 2, 2013).
Notification of Transmittal of the International Search Report and the Written Opinion of the International Searching Authority, or the Declaration for International Application No. PCT/US2012/021874 (Sep. 21, 2012).
Final Official Action for U.S. Appl. No. 12/906,998 (Mar. 29, 2012).
Non-Final Official Action for U.S. Appl. No. 12/906,998 (Sep. 21, 2011).
Tsou et al., "Realm-Based Redirection in Diameter," draft-ietf-dime-realm-based-redirect-03, RFC 3588, pp. 1-6 (Jul. 12, 2010).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0 pp. 1-71 (Sep. 2009).
"3rd Generation Partnership Project; Technical Specification Group Services and System Aspects; Policy and charging control architecture (Release 8)," 3GPP TS 23.203, V8.1.1, pp. 1-87 (Mar. 2008).
"IP Multimedia Subsystem," printout from wikipedia.org, Wikimedia Foundation, Inc. (May 29, 2007).
"HP OpenCall Home Subscriber Server Software—Data Sheet", 4AA0-3360ENW Rev. 2, Hewlett-Packard Development Company, L.P. (Jul. 2006).
Tschofenig et al., "Securing the Next Steps in Signaling (NSIS) Protocol Suite," International Journal of Internet Protocol Technology, vol. 1, pp. 1-14 (2006).
Stiemerling et al., "NAT/Firewall NSIS Signaling Layer Protocol (NSLP)," draft-ietf-nsis-nslp-natfw-06, pp. 1-70 (May 16, 2005).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP Map Gateway for Public WLAN SIm Authentication and Authorization," Cisco Systems, Inc., pp. 1-13 (Copyright 1992-2003).
Loshin, "19.4: Network Address Translation," TCP/IP Clearly Explained, Fourth Edition, Morgan Kaufman Publishers, pp. 435-437 (2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).

(56) References Cited

OTHER PUBLICATIONS

The attached email dated Oct. 20, 2001 and PowerPoint presentation dated Oct. 24, 2001 disclose an MSISDN-based auto-provisioning solution proposed by a customer of the assignee of the presend application.

"Agilent acceSS7 Business intelligence," Agilent Technologies, pp. 1-6 (Copyright 2001-Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

Rockhold, "Or," Wireless Review, p. 22, 23, 26, 28, 30, 32, (Aug. 15, 2000).

"Topsail Beach-SS7 Over IP-" Cisco Systems, Inc., pp. 1-16 (Copyright 1999).

Smith, "Number Portability Pileup," Telephony, p. 22, 24, 26, (Jan. 6,1997).

Jain et al., "Phone Number Portability for PCS Systems with ATM Backbones Using Distributed Dynamic Hashing," IEEE, vol. 15 (No. 1), p. 96-105, (Jan. 1997).

Heinmiller, "Generic Requirements for SCP Application and GTT Function for Number Portability," Illinois Number Portability Workshop, p. 1-50, (Sep. 4, 1996).

International Telecommunication Union, "Series Q: Switching and Signalling: Specifications of Signalling Systems No. 7-Signalling Connection Control Part," p. 11-16, (Jul. 1996).

Rice, "SS7 Networks in a PCS World," Telephony, pp. 138, 140 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signaling Requirements for Number Portability," AT&T Network Systems, No. 1, p. 1-75, (Feb. 2, 1996).

ETSI, Digital Cellular Telecommunications System (Phase 2+); Milbe Application Part (MAP) Specification, Global System for Mobile Communications, pp. 112-114 (1996).

Jain, et al., "A Hashing Scheme for Phone Number Portability in PCS Systems with ATM Backbones," Bell Communications Research, p. 593-597, (1996).

Bishop, "Freeing the Network for Competition," Telecommunications, p. 75-80, (Apr. 1995).

Anonymous, "Zeichengabesysteme-Eine neue Generation für ISDN und intelligente Netze," Zeichengabnesystem, Medien-Institut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network Interface Specification (CCSNIS) Supporting SCCP and TCAP," Bell Communications Research, p. ii-xii, 1-1-C-22, (Mar. 1994).

Buckles, "Very High Capacity Signaling Trnsfer Point for Intelligent Network Servcies," DSC Communciations Corporation, p. 1308-1311, (1988).

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

\* cited by examiner

METHODS, SYSTEMS, AND COMPUTER READABLE MEDIA FOR MULTI-INTERFACE MONITORING AND CORRELATION OF DIAMETER SIGNALING INFORMATION

PRIORITY CLAIM

This application is a continuation-in-part of U.S. patent application Ser. No. 12/906,816 filed Oct. 18, 2010, which claims the benefit of U.S. Provisional Patent Application Ser. No. 61/252,557 filed Oct. 16, 2009. This application further claims the benefit of U.S. Provisional Patent Application Ser. No. 61/304,310 filed Feb. 12, 2010. The disclosures of each of the applications referenced in this paragraph are incorporated herein by reference in their entireties.

STATEMENT OF INCORPORATION BY REFERENCE

The disclosures of each of the following commonly-owned, co-pending U.S. Patent Applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to methods and systems for monitoring signaling messages. More particularly, the subject matter described herein relates to methods, systems, and computer readable media for multi-interface monitoring and correlation of Diameter and signaling information.

BACKGROUND

Diameter is an authentication, authorization and accounting (AAA) protocol for computer networks, and is a successor to Radius. The Diameter base protocol is defined in International Engineering Task Force (IETF) request for comments (RFC) 3588 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be exchanged between Diameter nodes for performing various functions. For example, a mobility management entity (MME) and a home subscriber server (HSS) may interact for authentication, authorization, and/or accounting (AAA) purposes. While RFC 3588 discloses various aspects involving Diameter, an architecture for monitoring Diameter signaling messages is not adequately defined.

Accordingly, there exists a need for methods, systems, and computer readable media for multi-interface monitoring and correlation of Diameter signaling information.

SUMMARY

According to one aspect, the subject matter described herein includes a method for multi-interface monitoring and correlation of Diameter signaling information. The method includes copying Diameter information from a first signaling message traversing a first signaling interface. The method further includes copying information from a second signaling message traversing a second signaling interface. The method further includes correlating the Diameter information from the first signaling message with the information from the second signaling message and storing the correlated information in a memory device.

According to another aspect, the subject matter described herein includes a system for multi-interface monitoring and correlation of Diameter signaling information. The system includes a first screening module for copying Diameter information from a Diameter message traversing a first signaling interface. The system includes a second screening module for copying information from a second signaling message traversing a second signaling interface. The system includes a correlation module for correlating the Diameter information with the information from the second signaling message and storing the correlated information in a memory device.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
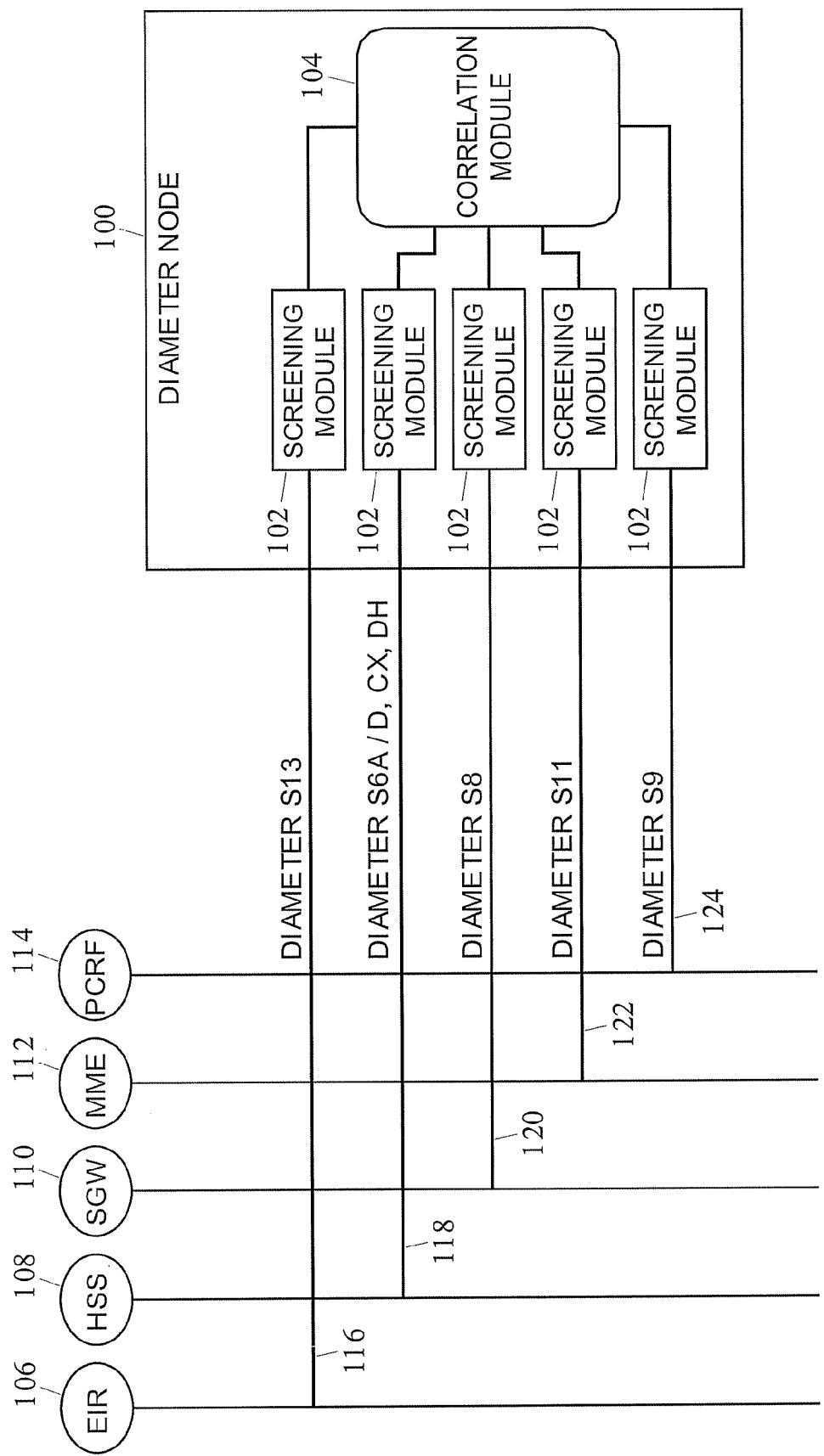
FIG. 1 is a diagram illustrating connectivity between various nodes and a Diameter node via Diameter interfaces according to an embodiment of the subject matter described herein.

FIG. 1 is a diagram illustrating connectivity between various nodes and a Diameter node via Diameter interfaces according to an embodiment of the subject matter described herein. In the embodiment illustrated in FIG. 1, various Diameter nodes, including a Diameter node 100, are depicted. Diameter nodes may be nodes capable of implementing or using a Diameter protocol. For example, Diameter node 100 may comprise a Diameter signaling router (DSR) a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a charging data function (CDF), an online charging system, an offline charging system, a policy and charging enforcement function (PCEF), a policy and charging rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, a Diameter message processor, a data collection platform, a multi-protocol signaling gateway, a multi-protocol signaling router, or a computing platform. Examples of a Diameter signaling router include, but are not limited to, a Diameter routing agent, a Diameter relay agent, a Diameter redirect agent, a Diameter translation agent, a Diameter proxy agent.

Referring to FIG. 1, Diameter node 100 may include functionality for processing various messages and may include various communications interfaces for communication with Diameter nodes, e.g., 3rd Generation Partnership Project (3GPP) LTE communications interfaces and other (e.g., non-LTE) communications interfaces. Diameter node 100 may include functionality for correlating and/or monitoring Diameter messages associated with one or more communications interfaces. In one embodiment, correlating and/or monitoring functionality may be included in one or more modules. For example, Diameter node 100 may include or have access to one or more screening modules 102 and a correlation module 104 for simultaneously monitoring and correlating Diameter signaling messages, or copies thereof, that are associated with multiple different Diameter signaling interfaces, e.g., S9, S6a, S11, Cx, Dx, et cetera.

Screening modules 102 may include functionality for processing and/or copying messages. For example, signaling messages traversing a node via an interface may be processed or screened by screening modules 102. In one embodiment, screening modules 102 may be adapted to screen signaling messages (e.g., Diameter messages) based on one or more screening rules and/or policies. If a signaling message matches a rule and/or policy, the signaling message, or portion thereof, may be copied. The copied message may be sent to other modules (e.g., correlation module 104) and/or nodes for further processing.

Correlation module 104 may include functionality for correlating messages. In one embodiment, correlation module 104 may include functionality for identifying (e.g., indexing, tagging, or associating) related Diameter messages and/or other signaling messages. For example, correlation processing may include correlating received Diameter messages that are associated with the same subscriber, session, and/or access node.

In one embodiment, a screening module 102 and a correlation module 104 may be integrated at a single node or may each be located at distinct nodes. For example, a screening module 102 and a correlation module 104 may be located at Diameter node 100. In another example, a screening module 102 may be located at Diameter node 100 and a correlation module 104 may located at a distinct computing platform. In yet example, a screening module 102 may be located at a link probe and a correlation module 104 may located at a distinct computing platform and/or node. In one embodiment, a screening module 102 and correlation module 104 may be integrated into a single module or function. For example, a monitoring module may copy and correlate signaling messages.

In the embodiment illustrated in FIG. 1, Diameter node 100 (e.g., a DSR) may communicate with Equipment Identity Register (EIR) 106 via a Diameter S13 interface 116. Diameter node 100 may also communicate with HSS 108 via a Diameter S6a interface, a Diameter S6d interface, a Diameter Cx interface, or a Diameter Dh interface (collectively referred to herein as an HSS interface 118). Diameter node 100 may communicate with serving gateway (SGW) 110 via a Diameter S8 interface 120. Diameter node 100 may communicate with MME 112 via a Diameter S11 interface 122. Diameter node 100 may communicate with PCRF 114 via a Diameter Gx, Rx, or S9 interface 124. Diameter node 100 may also interface with a packet gateway, such as a GGSN or PDN Gateway, via a Gy, Gz, Ro, or Rf interfaces (not shown).

In one embodiment, each interface may be associated with a unique screening module 102. For example, at a DSR, a Dx interface may be associated with a Dx screening module 102. In other embodiments, interfaces may share or use one or more screening modules 102. For example, at a DSR, a message processor may include a screening module 102 for screening messages received from a plurality of interfaces.

In one embodiment, Diameter node 100 may receive Diameter messages via other Diameter interfaces. For example, Diameter node 100 may receive Diameter message via an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

While FIG. 1 depicts Diameter node 100 communicating with (e.g., receiving Diameter messages from) various Diameter nodes via particular Diameter interfaces, it will be appreciated that Diameter node 100 may communicate with the nodes depicted and other nodes via additional and/or different interfaces.

Figure 2:
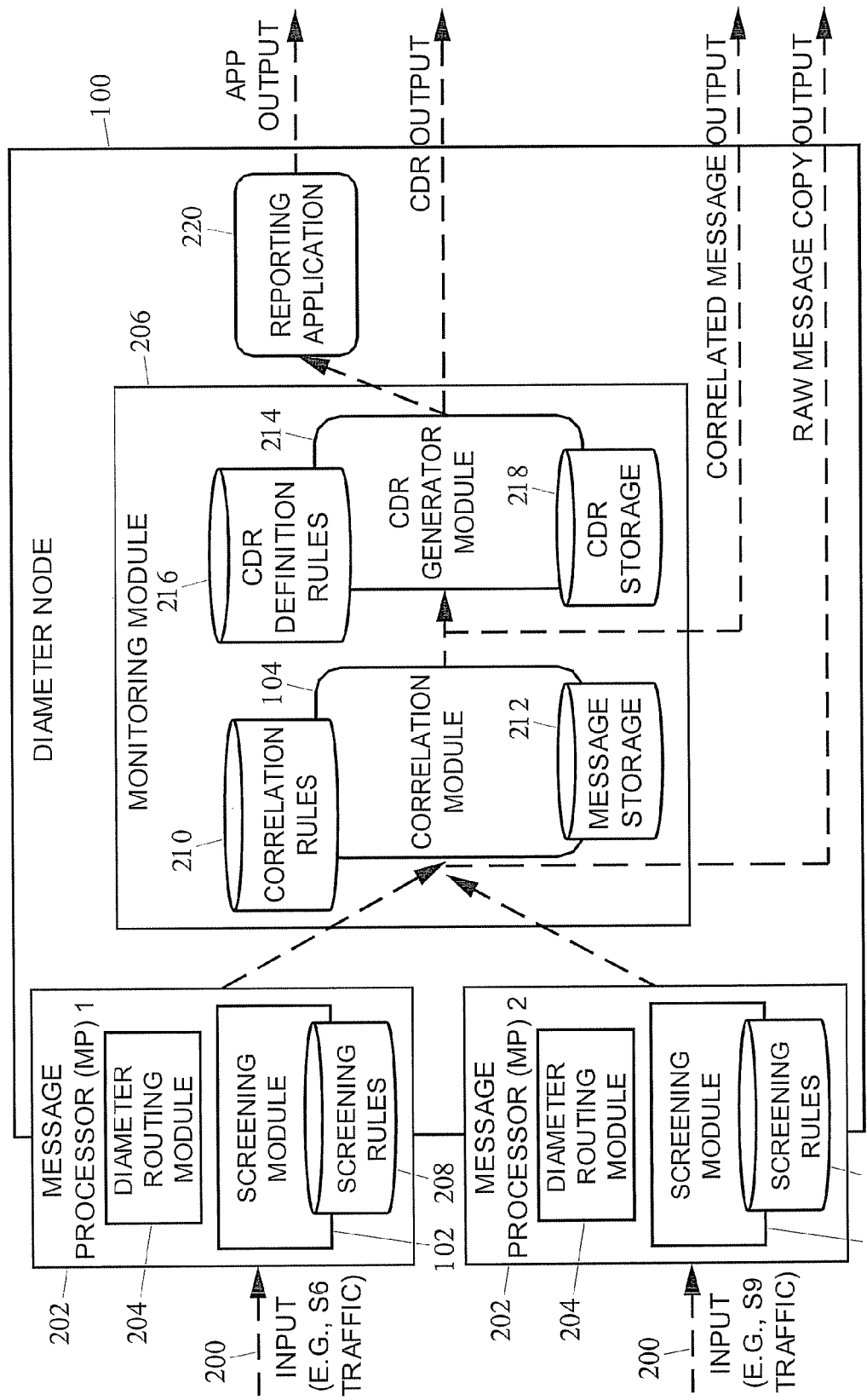
FIG. 2 is a diagram illustrating an exemplary Diameter node for monitoring messages via Diameter interfaces according to an embodiment of the subject matter described herein.

FIG. 2 is a diagram illustrating an exemplary Diameter node for monitoring messages via Diameter interfaces according to an embodiment of the subject matter described herein. In the embodiment illustrated in FIG. 2, Diameter node 100 (e.g., a DSR) may include various modules, components, and/or functionality for performing Diameter interface monitoring and/or providing monitoring information. Diameter node 100 may include one or more message processors (MPs) 202 for receiving and/or processing Diameter messages. For example, an MP 202 may be adapted to receive and process Diameter messages that are associated with one or more Diameter interfaces, such as a Diameter S6a signaling interface. In another example, an MP 202 may be adapted to receive and process particular Diameter messages (e.g., UpdateLocation Request (ULR) messages and UpdateLocation Answer (ULA) messages) that are associated with any Diameter interface.

Each MP 202 may include functionality for receiving, copying, and/or processing Diameter messages. For example, as illustrated in FIG. 2, an MP 202 may include a Diameter routing module 204, a screening module 102, and screening rules storage 208. Diameter routing module 204 may include various rules, policies, and/or information for relaying or routing Diameter messages to an appropriate destination (e.g., a Diameter application or node). For example, after receiving, copying, and/or processing a Diameter message, Diameter routing module 204 may determine (e.g., using message header information and a route list) an appropriate destination for the Diameter message.

Screening module 102 may include functionality for processing and/or copying signaling messages. In one embodiment, screening module 102 may be adapted to screen Diameter messages based on one or more screening rules. Exemplary screening rules may be used to copy, correlate, and/or monitor a Diameter message, or portions thereof, based on various factors. For example, screening module 102, using one or more screening rules, may copy messages, or portions thereof, that include a particular Visited-PLMN-ID value or a particular User-Name value. In another example, screening module 102, using screening rules, may copy messages, or portions thereof, associated with a particular Diameter interface.

In one embodiment, screening rule criteria may include a message type (e.g., a ULR message command code and Location Information Request (LIR) message command code, Credit Control Request (CCR) message command code, Re-Authorization Request message command code, etc.), time of day, a network condition, a network operator, a subscriber tier, a subscriber, an associated interface, an origination node, an origination network, a destination node, a destination network, or particular AVP code and/or information (e.g., Visited-PLMN-ID, SGSN-Number, and User-Name).

Screening rules storage 208 may include any entity (e.g., a database or memory cache) for maintaining or storing screening rules. Diameter node 100, including components (e.g., MPs 202) and modules therein, may access screening rules storage 208 for obtaining screening rules and/or related information. In one embodiment, screening rules storage 208 may be integrated with one or more MPs 202. In another embodiment, screening rules storage 208 may be distinct from and/or external to MPs 202.

In one embodiment, screened messages (e.g., Diameter messages, or portions thereof, that traverse MPs 202 and/or copies of such Diameter messages or portions) may be sent from Diameter node 100 to an external application or node for reporting and/or further processing. For example, copies of screened messages may be provided (e.g., as raw message copy output) to a node that is external to Diameter node 100.

In another embodiment, screened messages may be sent to one or more modules located at or integrated with Diameter node 100. For example, screened messages may be sent to monitoring module 206. Monitoring module 206 may include functionality for correlating, storing, and/or generating information (e.g., records, statistics and/or reports) associated with various signaling messages (e.g., Diameter messages). Monitoring module 206 may include various modules for performing one or more functions, such as correlation module 104 and communication detail record (CDR) or session detail record (SDR) generator module 214. As stated above, correlation module 104 may include functionality for correlating Diameter messages and/or other signaling messages.

Correlation module 104 may use correlation rules, policies, and/or information for performing correlation. For example, a correlation rule may be used to associate messages that are related to a subscriber or set of subscribers. In another example, a correlation rule may be used to associate messages that relate to a particular node, application, interface, protocol, network operator, or service provider.

Correlation rules storage 210 may include any entity (e.g., a database, cache, or other memory device) for maintaining or storing correlation rules, policies, and/or information for performing correlation. Diameter node 100, including components and modules therein, may access correlation rules storage 210 for obtaining correlation rules and/or related information. In one embodiment, correlation rules storage 210 may be integrated with Diameter node 100. In another embodiment, correlation rules storage 210 may be distinct from and/or external to Diameter node 100.

Message storage 212 may include any entity for maintaining or storing messages, or portions thereof, along with correlation information from correlation processing. Diameter node 100, including components and modules therein, may access message storage 212 for obtaining screened messages and/or related information. In one embodiment, message storage 212 may be integrated with Diameter node 100. In another embodiment, message storage 212 may be distinct from and/or external to Diameter node 100.

In one embodiment, after correlation is performed, correlated messages and/or related information may be provided to additional modules and/or external nodes. For example, correlated message output may be sent to an external node for generating monitoring records, such as CDRs/SDRs. In another example, correlated message output may be sent to a CDR/SDR generator module 214.

CDR/SDR generator module 214 may include functionality for generating and/or storing records, e.g., CDRs or message transactional records (MTRs). In one embodiment, CDR/SDR generator module 214 may generate a record that includes information from two or more correlated messages. For example, CDR/SDR generator module 214 may receive an indication that correlated messages are stored in message storage 212. CDR/SDR generator module 214 may retrieve the correlated message and generate appropriate records. In another example, correlated message output may be sent from correlation module 104 to CDR/SDR generation module 214 for further processing.

In one embodiment, CDR/SDR generator module 214 may use CDR/SDR definition rules, policies, and/or information for generating records. For example, CDRs may be generated with different information (e.g., types of content and/or format of content) based on CDR definition rules. In one embodiment, a CDR definition rule may be used to format a record and/or determine what information is to be included in the record. For example, a CDR definition rule may be used to format CDRs for messages associated with a particular node, application, interface, protocol, network operator, or service provider to include particular criteria and/or characteristics. In another example, a CDR definition rule may be used to determine which correlated messages, or portions thereof, are to be included in a particular record. In yet another example, a CDR definition rule may specify that only particular Diameter AVP information be included in a CDR.

In yet another example, the Diameter information correlated from messages received from different interfaces of Diameter node 100 may be sent to an external application, with or without intermediate CDR/SDR generation. Examples of applications to which the correlated messages may be sent include a fraud detection application, a billing application, a charging data function, and a roaming verification application.

In FIG. 2, CDR definition rules storage 216 may include any entity for maintaining or storing CDR definition rules, policies, and/or information for performing correlation. Diameter node 100, including components and modules therein, may access CDR definition rules storage 216 for obtaining CDR definition rules and/or related information. In one embodiment, CDR definition rules storage 216 may be integrated with Diameter node 100. In another embodiment, CDR definition rules storage 216 may be distinct from and/or external to Diameter node 100.

After records are generated, CDR/SDR generator module 214 may store CDRs and/or related information. For example, CDRs may be stored in a memory device, such as CDR storage 218. CDR storage 218 may include any entity for maintaining or storing CDRs and/or related information. Diameter node 100, including components and modules therein, may access CDR storage 218 for obtaining CDR information. In one embodiment, CDR storage 218 may be integrated with Diameter node 100. In another embodiment, CDR storage 218 may be distinct from and/or external to Diameter node 100.

In one embodiment, after records are generated, CDRs and/or related information may be provided to additional modules and/or external nodes. For example, CDR output may be sent to an external node for generating monitoring records, such usage statistics or subscriber billings. In another example, CDR output may be sent to one or more applications, such as a reporting application 220.

Reporting application 220 may be any application or other entity for providing or generating information. For example, reporting application 220 may receive CDRs/SDRs, messages, correlated message information or other information and may process this information. In one embodiment, reporting application 220 may include, but is not limited to, a billing application, a billing verification application, a quality of service (QoS) application, a trouble-ticket generating application, a network diagnostic application, a business intelligence application, a service level agreement compliance verification application, a pre-paid services application, a fraud detection application, a lawful surveillance application, or other application.

While FIG. 2 depicts various modules within Diameter node 100, it will be appreciated that Diameter node 100 may include fewer, additional, or different modules and/or components. Further, each module depicted in FIG. 2 may include fewer, additional, or different modules and/or components. For example, monitoring module 206 may be separate or distinct from correlation module 104. In another example, monitoring module 206 may include various applications, such as reporting application 220.

In the architecture described above with respect to FIG. 2, screening modules 208 associated with message processors 202 copy Diameter signaling messages and send the messages to correlation module 104 for correlation. In an alternate implementation, because Diameter is a hop-by-hop protocol, message processors 202 may maintain a pending transaction list for every Diameter request message that traverses a message processor. Upon receiving an answer message, message processors 202 may correlate the answer with a pending request using the transaction list. Once the correlation is successfully completed, Diameter routing requires that the answer message be propagated back to the downstream peer that sent the message. Because Diameter routing implemented by message processors 202 is required to perform message correlation, screening modules 102 may correlate messages and consolidate the correlated messages into a single message. The single message may be sent to monitoring module 106. Because message correlation is performed by the message processors, correlation on monitoring module 206 may be omitted.

Figure 3:
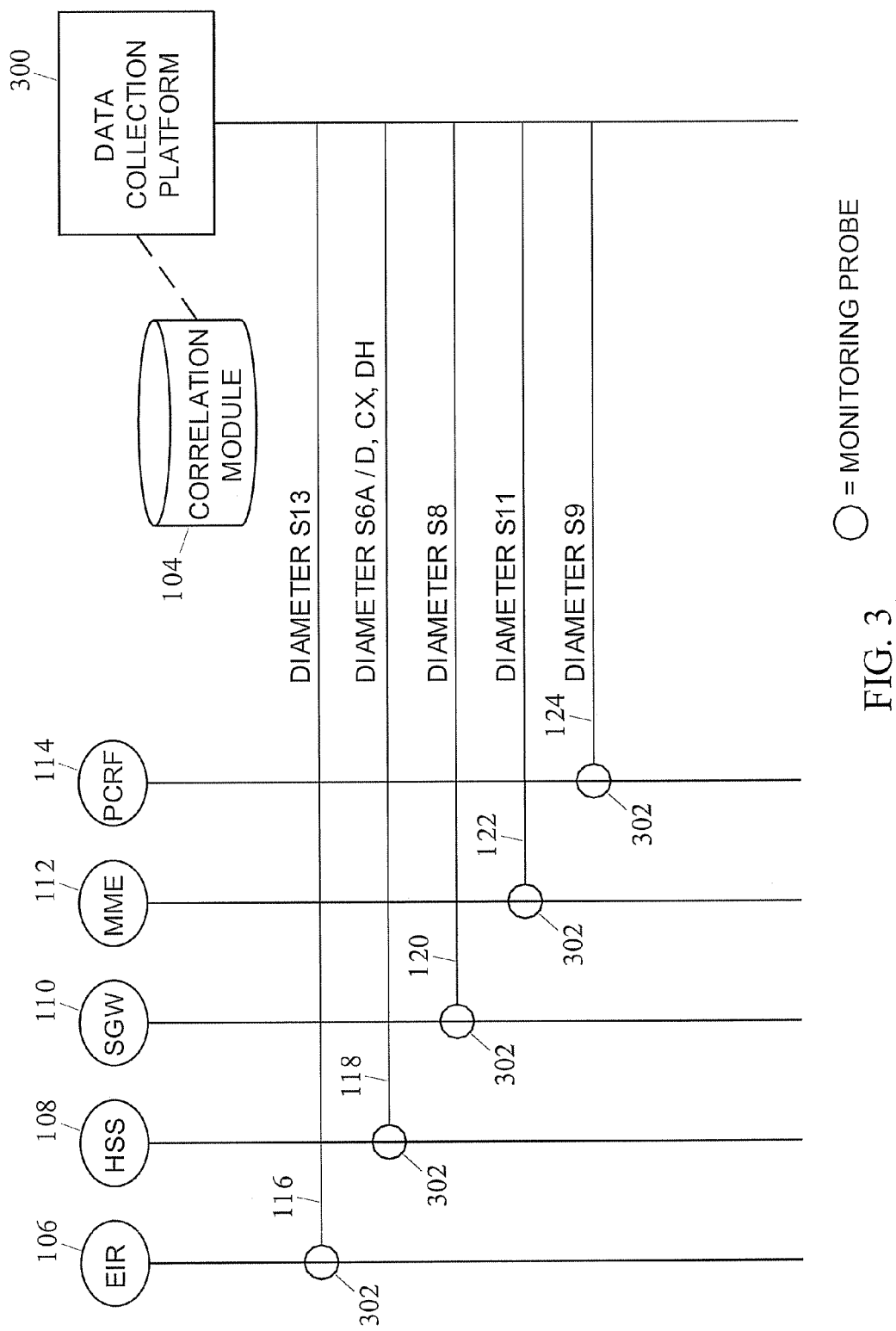
FIG. 3 is a diagram illustrating a data collection platform monitoring Diameter interfaces according to an embodiment of the subject matter described herein.

FIG. 3 is a diagram illustrating a data collection platform monitoring Diameter interfaces according to an embodiment of the subject matter described herein. In the embodiment illustrated in FIG. 3, data collection may include functionality for collecting information. For example, data collection platform 300 may include functionality for processing various messages (e.g., one or more processors) and may include various communications interfaces or Diameter applications for receiving communications from monitoring probes 302.

In one embodiment, monitoring probes 302 may include any suitable entities (e.g., link probes or nodes) for detecting, intercepting, and/or copying messages traversing a communications network, or links therein. For example, monitoring probes 302 may be located at various links or connections in a communications network. Monitoring probes 302 may be adapted to detect, intercept, and/or copy signaling messages (e.g., Diameter messages). In one embodiment, monitoring probes 302 may include or have access to one or more screening modules 102. In another embodiment, monitoring probes 302 may copy all signaling messages or may copy signaling messages based on preconfigured information. For example, monitoring probes 302 may copy all messages that traverse an interface when monitoring probes 302 are active or activated (e.g., by network operator or a trigger). Monitoring probes 302 may include the capability to decrypt observed Diameter messages that were encrypted prior to being communicated across a monitored Diameter connection.

Data collection platform 300 may include or have access to functionality for receiving, copying, and/or correlating Diameter messages associated with one or more communications interfaces. For example, data collection platform 300 may include a module capable of simultaneously monitoring, copying, and correlating Diameter signaling messages, or copies thereof, that are associated with (e.g., observed on) multiple different Diameter signaling interfaces, e.g., S9, S6a, S11, Cx, Dx, et cetera. In another example, data collection platform 300 may access monitoring module 206 and/or correlation module 104 at one or more distinct nodes.

In the embodiment illustrated in FIG. 3, data collection platform 300 (e.g., a DSR) may receive Diameter messages associated with EIR 106 and/or associated with Diameter 513 interface 116. For example, a monitoring probe 302 may be adapted to copy Diameter messages to or from EIR 106. In this example, monitoring probe 302 may send the copy to data collection platform 300 for additional processing. Data collection platform 300 may receive Diameter messages associated with HSS 108 and/or associated with HSS interface 118. Data collection platform 300 may receive Diameter messages associated with SGW 110 and/or associated with Diameter S8 interface 120. Data collection platform 300 may receive Diameter messages associated with MME 112 and/or associated with Diameter S11 interface 122. Data collection platform 300 may receive Diameter messages associated with PCRF 114 and/or associated with Diameter S9 interface 124.

In one embodiment, data collection platform 300 may receive Diameter messages associated with other Diameter interfaces. For example, Data collection platform 300 may receive Diameter message from a monitoring probe 302 that monitors an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

While FIG. 3 depicts data collection platform 300 receiving Diameter messages from monitoring probes associated with particular Diameter interfaces, it will be appreciated that data collection platform 300 may receive Diameter messages from monitoring probes associated with additional and/or different interfaces (e.g., Signaling System 7, SIGTRAN, Session Initiation Protocol (SIP), etc.).

Figure 4:
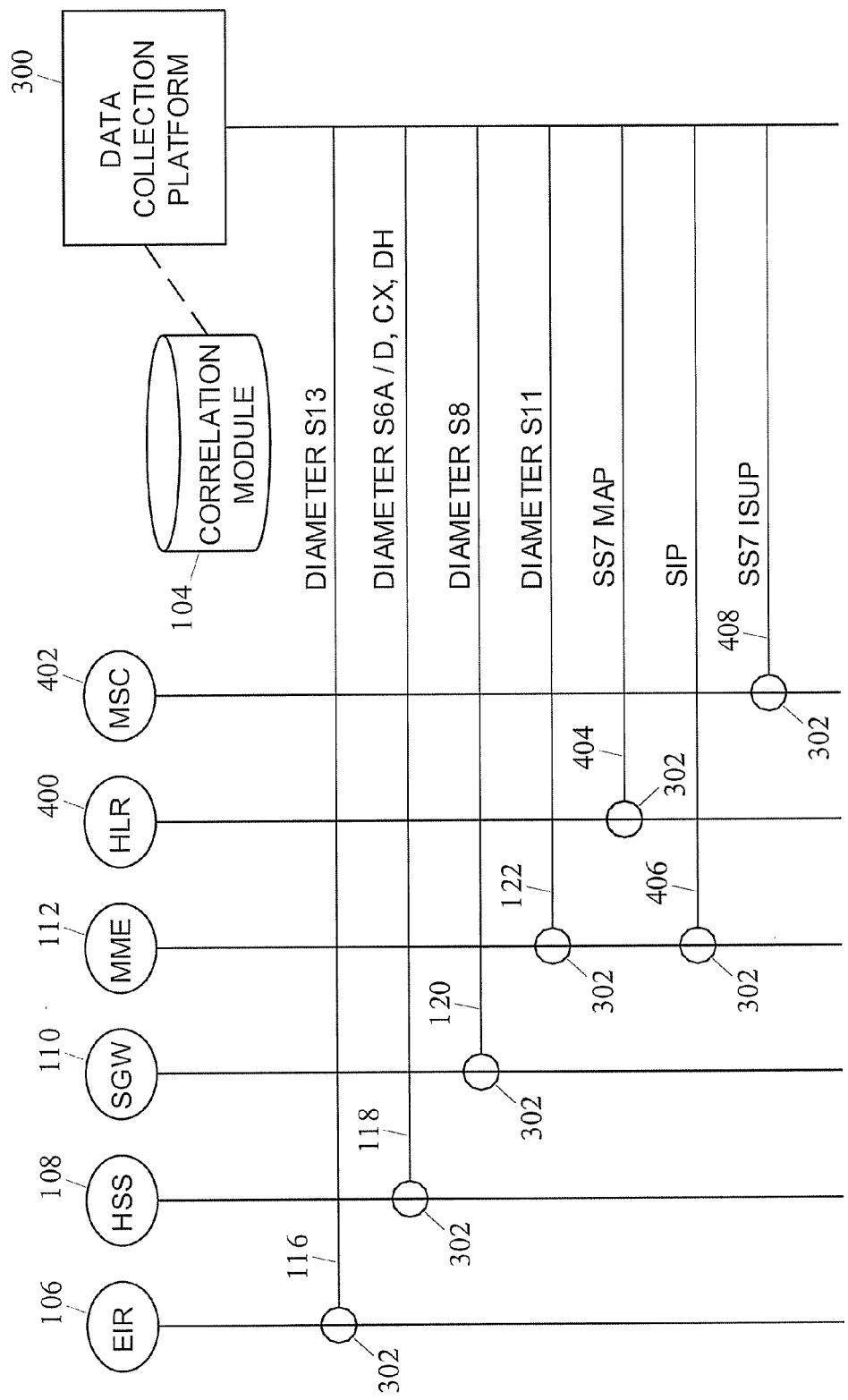
FIG. 4 is a diagram illustrating a data collection platform monitoring various interfaces according to an embodiment of the subject matter described herein.

FIG. 4 is a diagram illustrating a data collection platform monitoring various interfaces according to an embodiment of the subject matter described herein. Except as disclosed herein, data collection platform 300 of FIG. 4 is essentially the same as described in reference to FIG. 3. In this embodiment, data collection platform 300 includes functionality for receiving signaling messages, or portions thereof, associated with various interfaces, including Diameter interfaces and non-Diameter interfaces. For example, data collection platform 300 may receive Diameter messages, SIP messages, SS7 messages, mobile application part (MAP) messages, SIGTRAN messages, mobile application part (MAP) messages, signaling connection control part (SCCP) message, SCCP User Adaptation layer (SUA) messages, integrated services digital network (ISDN) messages, ISDN user part (ISUP) messages, ISDN user adaptation layer (IUA) messages, Internet protocol (IP) messages, and other messages.

Data collection platform 300 may receive Diameter messages from monitoring probes 302 as described in reference to FIG. 3. In addition, data collection platform 300 may receive signaling messages from monitoring probes 302 that monitor one or more non-Diameter interfaces. In one embodiment, a non-Diameter interface may include a SIP interface, an SS7 interface, a MAP interface, a SIGTRAN interface, a stream control transmission protocol (SCTP) interface, an ISDN interface, an ISUP interface, an IUA interface, a message transfer part (MTP) 2 user peer-to-peer adaptation layer (M2PA) interface, an MTP 2 user adaptation layer (M2UA) interface, an MTP 3 user adaptation layer (M3UA) interface, an SCCP interface, a SUA interface, a V5 user adaptation layer (V5UA) interface, a customized applications for mobile networks enhanced logic (CAMEL) interface, or an IP interface.

Referring to FIG. 4, data collection platform 300 may receive Diameter messages from monitoring probes 302 associated with Diameter nodes and/or Diameter interfaces as described in reference to FIG. 3. In addition, data collection platform 300 may receive non-Diameter signaling messages associated with a home location register (HLR) 400 and/or associated with an SS7 MAP interface 404. Data collection platform 300 may receive non-Diameter signaling messages associated with MME 112 and/or associated with a SIP interface 306. Data collection platform 300 may receive non-Diameter signaling messages associated with mobile switching center (MSC) 402 and/or associated with a SS7 ISUP interface 308.

Figure 5:
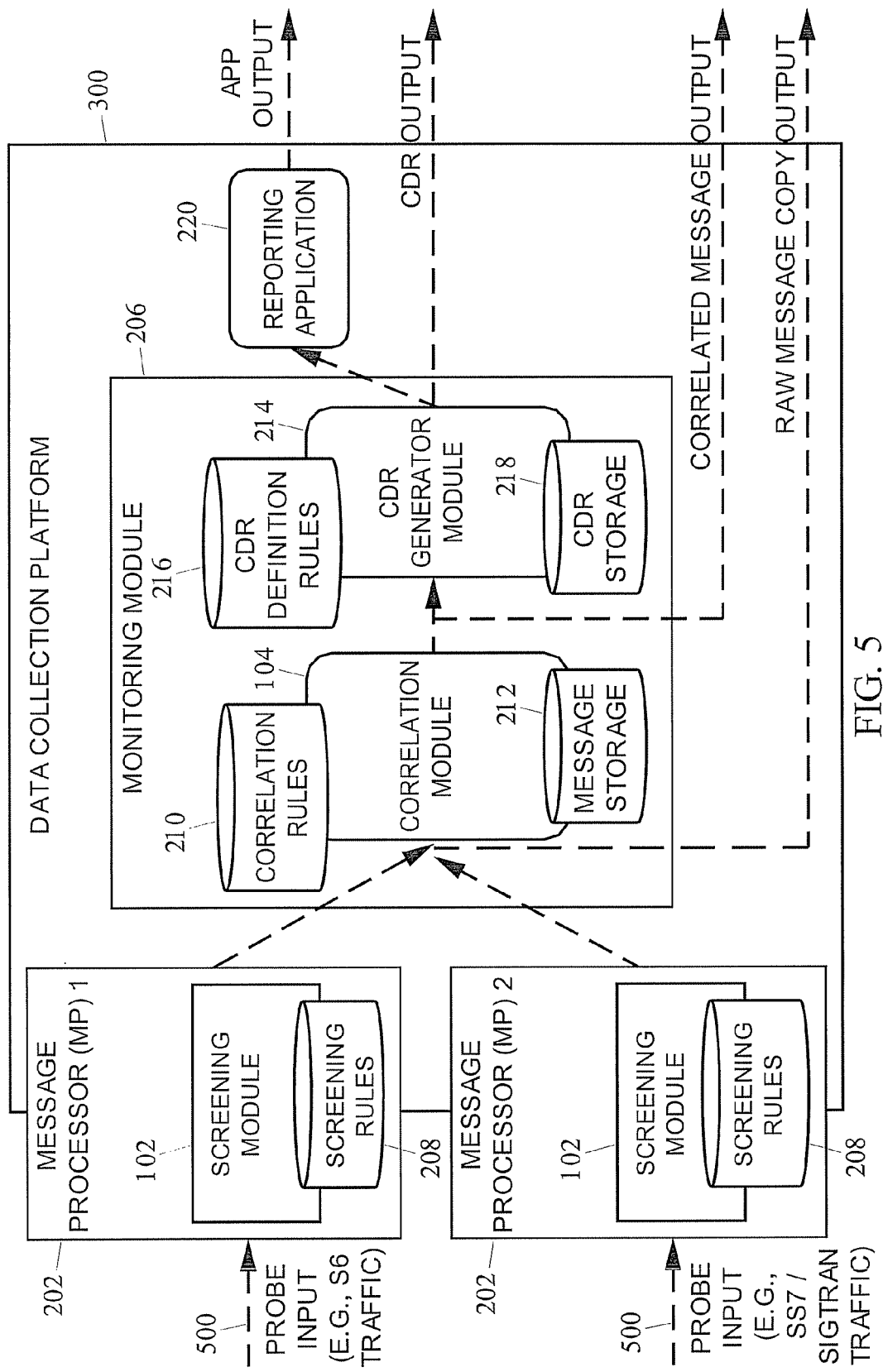
FIG. 5 is a diagram illustrating an exemplary data collection platform for monitoring messages via various interfaces according to an embodiment of subject matter described herein.

FIG. 5 is a diagram illustrating an exemplary data collection platform for monitoring messages via various interfaces according to an embodiment of subject matter described herein. In the embodiment illustrated in FIG. 5, data collection platform 300 (e.g., a stand-alone monitoring system) may include various modules, components, and/or functionality for collecting information associated with interface and/or communications monitoring. Data collection platform 300 may include various message processors (MPs) 202 for receiving, copying, and/or processing Diameter messages and/or other signaling messages. For example, a first MP 202 may be adapted to receive and process Diameter messages (e.g., Diameter request messages and Diameter answer messages) that are associated with one or more Diameter interfaces, such as a Diameter S6a signaling interface. In this example, a second MP 202 may be adapted to receive and process non-Diameter signaling messages (e.g., SIGTRAN messages and SS7 messages) that are associated with other signaling interfaces. In another example, an MP 202 may be adapted to receive, copy, and/or process any signaling messages associated with particular signaling interfaces (e.g., SIP, S11, Cx, Dx, et cetera).

Each MP 202 may include a screening module 102 and screening rules storage 208. Screening module 102 may include functionality for processing and/or copying signaling messages. For example, screening module 102 may be used to screen messages received from monitoring probes 302.

In one embodiment, screening module 102 may be adapted to screen Diameter and/or other signaling messages based on one or more screening rules. Exemplary screening rules may be used to copy, correlate, and/or monitor a Diameter message, or portions thereof, based on various factors. For example, screening module 102, using one or more screening rules, may indicate that messages, or portions thereof, that include a particular Visited-PLMN-ID value or a particular User-Name value be stored and/or correlated. In another example, screening module 102, using screening rules, may copy messages, or portions thereof, associated with a particular signaling interface (e.g., a SUA/MAP interface).

Screening rules storage 208 may include any entity (e.g., a database or memory cache) for maintaining or storing screening rules. Data collection platform 300, including components (e.g., MPs 202) and modules therein, may access screening rules storage 208 for obtaining screening rules and/or related information. In one embodiment, screening rules storage 208 may be integrated with one or more MPs 202. In another embodiment, screening rules storage 208 may be distinct from and/or external to MPs 202.

In an alternative embodiment, each MP 202 may not include a screening module 102 and/or related functionality. Instead, signaling messages may be screened by monitoring probes 302. Each MP 202 may provide the pre-screened signaling messages to modules and/or nodes (e.g., internal or external locations) for further processing.

In one embodiment, screened messages (e.g., signaling messages, or portions thereof, that traverse MPs 202 and/or copies of such signaling messages or portions) may be sent from data collection platform 300 to an external application or node for reporting and/or further processing. For example, copies of screened messages may be provided (e.g., as raw message copy output) to a node that is external to data collection platform 300.

In another embodiment, screened messages may be sent to one or more modules located at or integrated with data collection platform 300. For example, screened messages may be sent to monitoring module 206. Monitoring module 206 may include various modules for performing one or more functions, such as correlation module 104 and CDR generator module 214. As stated above, correlation module 104 may include functionality for correlating Diameter messages and/or other signaling messages, e.g., SS7 messages, SIP messages, IP messages, and SIGTRAN messages.

Correlation module 104 may use correlation rules, policies, and/or information for performing correlation. For example, a correlation rule may be used to associate messages that are related to a subscriber or set of subscribers. In another example, a correlation rule may be used to associate messages that relate to a particular node, application, interface, protocol, network operator, or service provider. For instance, correlation module 104 may associate, using a correlation rule, copied Diameter and SS7 MAP messages that are associated with the same subscriber. In this instance, the correlation rule may direct correlation module 104 to associate Diameter messages that contain a particular value in a User-Name AVP and MAP messages that contain the same or similar value in a subscriber identifier parameter (e.g., IMSI parameter).

Correlation rules storage 210 may include any entity for maintaining or storing correlation rules, policies, and/or information for performing correlation. Data collection platform 300, including components and modules therein, may access correlation rules storage 210 for obtaining correlation rules and/or related information. In one embodiment, correlation rules storage 210 may be integrated with data collection platform 300. In another embodiment, correlation rules storage 210 may be distinct from and/or external to data collection platform 300.

Message storage 212 may include any entity for maintaining or storing messages, or portions thereof, along with correlation information from correlation processing. Data collection platform 300, including components and modules therein, may access message storage 212 for obtaining screened messages and/or related information. In one embodiment, message storage 212 may be integrated with data collection platform 300. In another embodiment, message storage 212 may be distinct from and/or external to data collection platform 300.

In one embodiment, after correlation is performed, correlated messages and/or related information may be provided to additional modules and/or external nodes. For example, correlated message output may be sent to an external node for generating monitoring records, such as CDRs. In another example, correlated message output may be sent to a CDR/SDR generator module 214.

CDR generator module 214 may include functionality for generating and/or storing records, e.g., CDRs or message transactional records (MTRs). In one embodiment, CDR/SDR generator module 214 may generate a record that includes information from two or more correlated messages. For example, CDR/SDR generator module 214 may receive an indication that correlated messages are stored in message storage 212. CDR/SDR generator module 214 may retrieve the correlated message and generate appropriate records. In another example, correlated message output may be sent from correlation module 104 to CDR/SDR generation module 214 for further processing.

In one embodiment, CDR/SDR generator module 214 may use CDR definition rules, policies, and/or information for generating records. For example, CDRs may be generated with different information (e.g., types of content and/or format of content) based on CDR definition rules. In one embodiment, a CDR definition rule may be used to format a record and/or determine what information is to be included in the record. For example, a CDR definition rule may be used to format CDRs for messages associated with a particular node, application, interface, protocol, network operator, or service provider to include particular criteria and/or characteristics. In another example, a CDR definition rule may be used to determine which correlated messages, or portions thereof, are to be included in a particular record. In yet another example, a CDR definition rule may specify that particular Diameter AVP information and particular MAP information should be included in a CDR.

CDR definition rules storage 216 may include any entity for maintaining or storing CDR definition rules, policies, and/or information for performing correlation. Data collection platform 300, including components and modules therein, may access CDR definition rules storage 216 for obtaining CDR definition rules and/or related information. In one embodiment, CDR definition rules storage 216 may be integrated with data collection platform 300. In another embodiment, CDR definition rules storage 216 may be distinct from and/or external to data collection platform 300.

After records are generated, CDR/SDR generator module 214 may store CDRs and/or related information. For example, CDRs may be stored in a memory device, such as CDR storage 218. CDR storage 218 may include any entity for maintaining or storing CDRs and/or related information. Data collection platform 300, including components and modules therein, may access CDR storage 218 for obtaining CDR information. In one embodiment, CDR storage 218 may be integrated with data collection platform 300. In another embodiment, CDR storage 218 may be distinct from and/or external to data collection platform 300.

In one embodiment, after records are generated, CDRs and/or related information may be provided to additional modules and/or external nodes. For example, CDR output may be sent to an external node for generating monitoring records, such usage statistics or subscriber billings. In another example, CDR output may be sent to one or more applications, such as a reporting application 220.

Reporting application 220 may be any application or other entity for providing or generating information. For example, reporting application 220 may receive CDRs, messages, correlated message information, or other information and process this information. In one embodiment, reporting application 220 may include, but is not limited to, a billing application, a billing verification application, a quality of service (QoS) application, a trouble-ticket generating application, a network diagnostic application, a business intelligence application, a service level agreement compliance verification application, a pre-paid services application, a fraud detection application, a lawful surveillance application, or other application.

While FIG. 5 depicts various modules within data collection platform 300, it will be appreciated that data collection platform 300 may include fewer, additional, or different modules and/or components. Further, each module depicted in FIG. 5 may include fewer, additional, or different modules and/or components. For example, monitoring module 206 may be separate or distinct from correlation module 104. In another example, monitoring module 206 may include various applications, such as reporting application 220.

Figure 6:
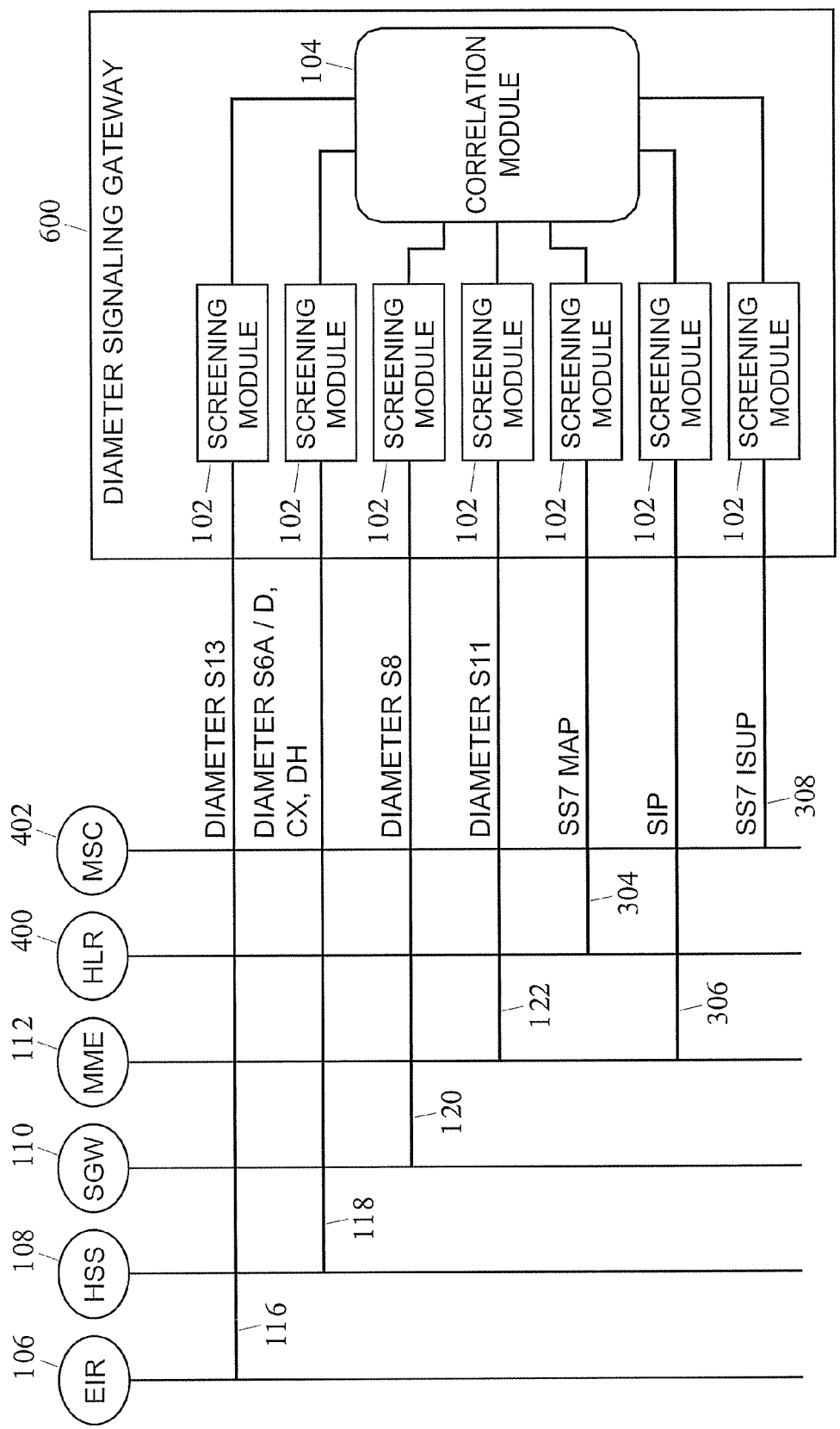
FIG. 6 is a diagram illustrating connectivity between various nodes and a Diameter node via various interfaces according to an embodiment of the subject matter described herein.

FIG. 6 is a diagram illustrating connectivity between various nodes and a Diameter node via various interfaces according to an embodiment of the subject matter described herein. In the embodiment illustrated in FIG. 6, Diameter signaling gateway 600 may be any suitable entity (e.g., a multi-protocol signaling router or multi-protocol signaling gateway) for receiving, processing, monitoring, converting, relaying, and/or routing various signaling messages. Except as disclosed herein, Diameter signaling gateway 600 of FIG. 6 is essentially the same as Diameter node 100 described in reference to FIGS. 1 and 2.

Diameter signaling gateway 600 includes functionality for receiving signaling messages, or portions thereof, associated with various interfaces, including Diameter interfaces and non-Diameter interfaces. For example, Diameter signaling gateway 600 may receive SIP messages, SS7 messages, mobile application part (MAP) messages, SIGTRAN messages, mobile application part (MAP) messages, signaling connection control part (SCCP) message, SCCP User Adaptation layer (SUA) messages, integrated services digital network (ISDN) messages, ISDN user part (ISUP) messages, ISDN user adaptation layer (IUA) messages, Internet protocol (IP) messages, and other messages.

Diameter signaling gateway 600 may receive Diameter messages via Diameter interfaces as described in reference to FIGS. 1 and 2. In addition, Diameter signaling gateway 600 may receive messages via one or more non-Diameter interfaces. In one embodiment, a non-Diameter interface may include a SIP interface, an SS7 interface, a MAP interface, a SIGTRAN interface, a stream control transmission protocol (SCTP) interface, an ISDN interface, an ISUP interface, an IUA interface, a message transfer part (MTP) 2 user peer-to-peer adaptation layer (M2PA) interface, an MTP 2 user adaptation layer (M2UA) interface, an MTP 3 user adaptation layer (M3UA) interface, an SCCP interface, a SUA interface, a V5 user adaptation layer (V5UA) interface, a customized applications for mobile networks enhanced logic (CAMEL) interface, or an IP interface.

Referring to FIG. 6, Diameter signaling gateway 600 may receive Diameter messages from Diameter nodes via Diameter interfaces as described in reference to FIGS. 1 and 2. In addition, Diameter signaling gateway 600 may communicate with (e.g., receive signaling messages from) HLR 400 via SS7 MAP interface 404. Data collection platform 300 may communicate with MME 112 via SIP interface 306. Data collection platform 300 may communicate with MSC 402 via SS7 ISUP interface 308.

Figure 7:
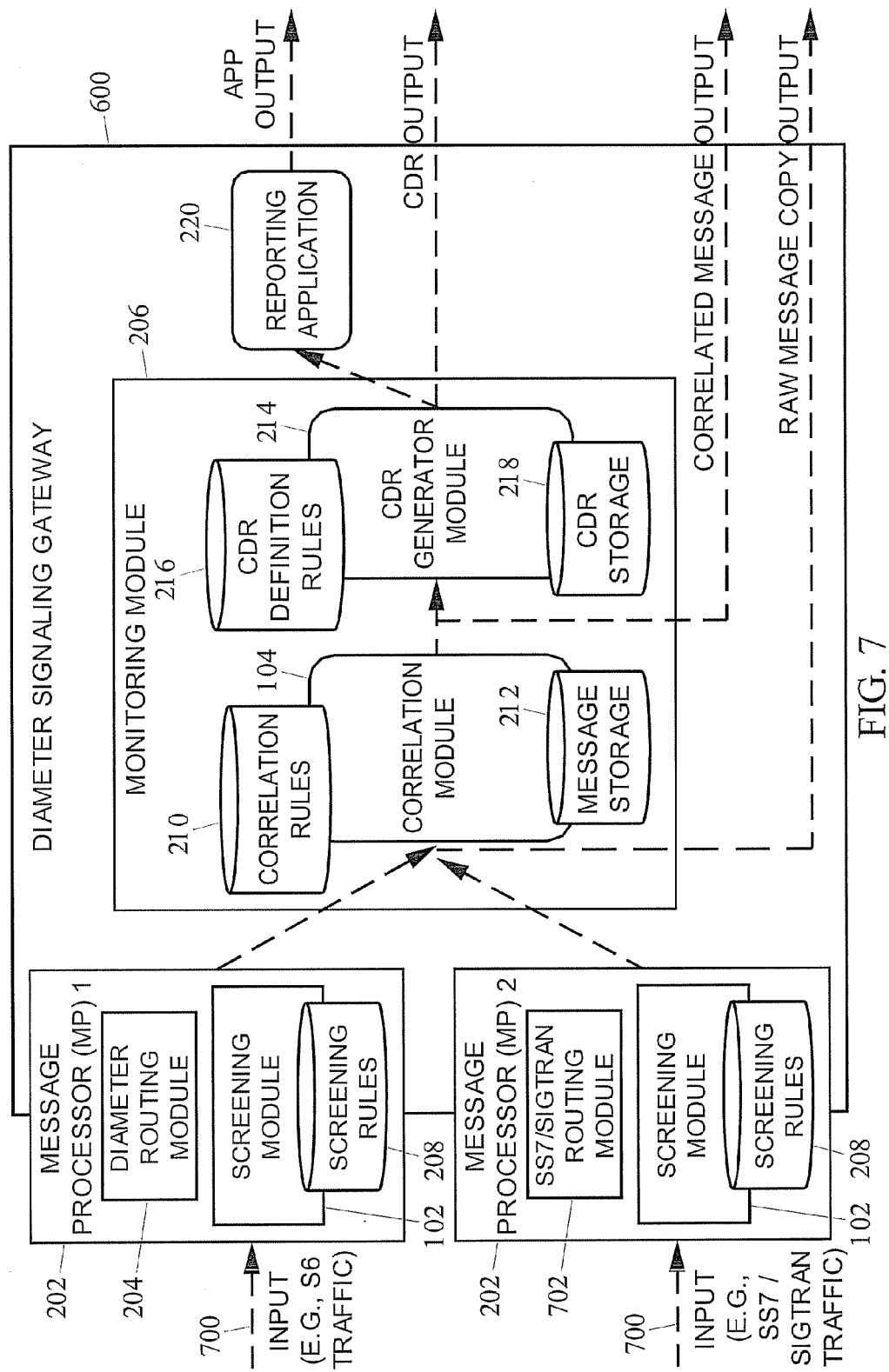
FIG. 7 is a diagram illustrating an exemplary Diameter signaling gateway node for monitoring messages via various interfaces according to an embodiment of the subject matter described herein.

FIG. 7 is a diagram illustrating an exemplary Diameter signaling gateway node for monitoring messages via various interfaces according to an embodiment of the subject matter described herein. In the embodiment illustrated in FIG. 7, Diameter signaling gateway 600 may include various modules, components, and/or functionality for performing interface and/or communications monitoring. Diameter signaling gateway 600 may include various message processors (MPs) 202 for receiving, copying, and/or processing Diameter messages and/or other signaling messages.

Each MP 202 may include a routing module (e.g., Diameter routing module 204 and SS7/SIGTRAN routing module 702), screening module 102, and screening rules storage 208. For example, as illustrated in FIG. 7, a first MP 202 may be adapted to receive and process SS7 and/or SIGTRAN messages. MP 202 may use SS7/SIGTRAN routing module 702 for relaying or routing such messages to an appropriate destination. SS7/SIGTRAN routing module 702 may include or have access to various rules, policies, and/or information for determining an appropriate destination. Also illustrated in FIG. 7, a second MP 202 may be adapted to receive and process Diameter messages. MP 202 may use Diameter routing module 702 for relaying or routing such messages to an appropriate destination. Diameter routing module 702 may include or have access to various rules, policies, and/or information for determining an appropriate destination.

In one embodiment, each MP 202 may include or have access to a conversion module for converting and/or translating signaling messages into various protocols and/or formats. For example, a conversion module may be located at or integrated with Diameter signaling gateway 600. In a second example, a conversion module may be located at or integrated with each MP 202.

Screening module 102 may include functionality for processing and/or copying signaling messages. In one embodiment, screening module 102 may be adapted to screen Diameter and/or other signaling messages based on one or more screening rules. Exemplary screening rules may be used to copy, correlate, and/or monitor a Diameter message, or portions thereof, based on various factors. For example, screening module 102, using one or more screening rules, may indicate that messages, or portions thereof, that include a particular Visited-PLMN-ID value or a particular User-Name value be stored and/or correlated. In another example, screening module 102, using screening rules, may copy messages, or portions thereof, associated with a particular signaling interface (e.g., a SS7/SIGTRAN interface).

In one embodiment, a screening factor may include a message type, time of day, a network condition, a network operator, a subscriber tier, a subscriber, an associated interface, an origination node, an origination network, a destination node, a destination network, or particular AVP information.

Screening rules storage 208 may include any entity (e.g., a database or memory cache) for maintaining or storing screening rules. Diameter signaling gateway 600, including components (e.g., MPs 202) and modules therein, may access screening rules storage 208 for obtaining screening rules and/or related information. In one embodiment, screening rules storage 208 may be integrated with one or more MPs 202. In another embodiment, screening rules storage 208 may be distinct from and/or external to MPs 202.

In one embodiment, screened messages (e.g., signaling messages, or portions thereof, that traverse MPs 202 and/or copies of such signaling messages or portions) may be sent from Diameter signaling gateway 600 to an external application or node for reporting and/or further processing. For example, copies of screened messages may be provided (e.g., as raw message copy output) to a node that is external to Diameter signaling gateway 600.

In another embodiment, screened messages may be sent to one or more modules located at or integrated with Diameter signaling gateway 600. For example, screened messages may be sent to monitoring module 206. Monitoring module 206 may include various modules for performing one or more functions, such as correlation module 104 and CDR generator module 214. As stated above, correlation module 104 may include functionality for correlating Diameter messages and/or other signaling messages, e.g., SS7 messages, SIP messages, IP messages, and SIGTRAN messages.

Correlation module 104 may use correlation rules, policies, and/or information for performing correlation. For example, a correlation rule may be used to associate messages that are related to a subscriber or set of subscribers. In another example, a correlation rule may be used to associate messages that relate to a particular node, application, interface, protocol, network operator, or service provider. For instance, correlation module 104 may associate, using a correlation rule, copied Diameter and SS7 MAP messages that are associated with the same subscriber. In this instance, the correlation rule may direct correlation module 104 to associate Diameter messages that contain a particular value in a User-Name AVP and MAP messages that contain the same or similar value in a subscriber identifier parameter.

Correlation rules storage 210 may include any entity for maintaining or storing correlation rules, policies, and/or information for performing correlation. Diameter signaling gateway 600, including components and modules therein, may access correlation rules storage 210 for obtaining correlation rules and/or related information. In one embodiment, correlation rules storage 210 may be integrated with Diameter signaling gateway 600. In another embodiment, correlation rules storage 210 may be distinct from and/or external to Diameter signaling gateway 600.

Message storage 212 may include any entity for maintaining or storing messages, or portions thereof, along with correlation information from correlation processing. Diameter signaling gateway 600, including components and modules therein, may access message storage 212 for obtaining screened messages and/or related information. In one embodiment, message storage 212 may be integrated with Diameter signaling gateway 600. In another embodiment, message storage 212 may be distinct from and/or external to Diameter signaling gateway 600.

In one embodiment, after correlation is performed, correlated messages and/or related information may be provided to additional modules and/or external nodes. For example, correlated message output may be sent to an external node for generating monitoring records, such as CDRs. In another example, correlated message output may be sent to a CDR/SDR generator module 214.

CDR/SDR generator module 214 may include functionality for generating and/or storing records, e.g., CDRs or message transactional records (MTRs). In one embodiment, CDR/SDR generator module 214 may generate a record that includes information from two or more correlated messages. For example, CDR/SDR generator module 214 may receive an indication that correlated messages are stored in message storage 212. CDR/SDR generator module 214 may retrieve the correlated message and generate appropriate records. In another example, correlated message output may be sent from correlation module 104 to CDR/SDR generation module 214 for further processing.

In one embodiment, CDR/SDR generator module 214 may use CDR definition rules, policies, and/or information for generating records. For example, CDRs may be generated with different information (e.g., types of content and/or format of content) based on CDR definition rules. In one embodiment, a CDR definition rule may be used to format a record and/or determine what information is to be included in the record. For example, a CDR definition rule may be used to format CDRs for messages associated with a particular node, application, interface, protocol, network operator, or service provider to include particular criteria and/or characteristics. In another example, a CDR definition rule may be used to determine which correlated messages, or portions thereof, are to be included in a particular record. In yet another example, a CDR definition rule may specify that particular Diameter AVP information and particular MAP information should be included in a CDR.

CDR definition rules storage 216 may include any entity for maintaining or storing CDR definition rules, policies, and/or information for performing correlation. Diameter signaling gateway 600, including components and modules therein, may access CDR definition rules storage 216 for obtaining CDR definition rules and/or related information. In one embodiment, CDR definition rules storage 216 may be integrated with Diameter signaling gateway 600. In another embodiment, CDR definition rules storage 216 may be distinct from and/or external to Diameter signaling gateway 600.

CDR definition rules storage 216 may include any entity for maintaining or storing CDR definition rules, policies, and/or information for performing correlation. Diameter signaling gateway 600, including components and modules therein, may access CDR definition rules storage 216 for obtaining CDR definition rules and/or related information. In one embodiment, CDR definition rules storage 216 may be integrated with Diameter signaling gateway 600. In another embodiment, CDR definition rules storage 216 may be distinct from and/or external to Diameter signaling gateway 600.

After records are generated, CDR/SDR generator module 214 may store CDRs and/or related information. For example, CDRs may be stored in a memory device, such as CDR storage 218. CDR storage 218 may include any entity for maintaining or storing CDRs and/or related information. Diameter signaling gateway 600, including components and modules therein, may access CDR storage 218 for obtaining CDR information. In one embodiment, CDR storage 218 may be integrated with Diameter signaling gateway 800. In another embodiment, CDR storage 218 may be distinct from and/or external to Diameter signaling gateway 600.

Reporting application 220 may be any application or other entity for providing or generating information. For example, reporting application 220 may receive CDRs, messages, correlated message information, or other information and process this information. In one embodiment, reporting application 220 may include, but is not limited to, a billing application, a billing verification application, a quality of service (QoS) application, a trouble-ticket generating application, a network diagnostic application, a business intelligence application, a service level agreement compliance verification application, a pre-paid services application, a fraud detection application, a lawful surveillance application, or other application.

While FIG. 7 depicts various modules within Diameter signaling gateway 600, it will be appreciated that Diameter signaling gateway 600 may include fewer, additional, or different modules and/or components. Further, each module depicted in FIG. 7 may include fewer, additional, or different modules and/or components. For example, monitoring module 206 may be separate or distinct from correlation module 104. In another example, monitoring module 206 may include various applications, such as reporting application 220.

In the above-described embodiments, screening modules 102 screen and copy Diameter signaling information based on screening rules. The screening rules may be dynamically populated and/or changed, for example by monitoring module 206 or by an external platform. In one example, monitoring module 206 may populate a first screening rule for use by a screening module. When the screening module detects a first Diameter signaling message matching the first rule, the screening module sends a copy of the message to the monitoring module. The monitoring module may utilize parameters in the first message to formulate a new screening rule for capturing messages related to the first message and communicate the new screening rule to the screening module. Such on-the-fly population of Diameter screening rules allows for correlation of messages based on different parameters. For example, an IMSI extracted from a Diameter message may be used to search for a subsequent Diameter or non-Diameter message that includes the IMSI. The destination host or other parameter (e.g., IMS public ID, IMS private ID, User-Name, MSISDN, SIP URI, Visited_PLMN_ID, etc.) in the subsequent message may be used as a new key to search or screen other messages received at the monitoring module. In distributed architecture implementations that include multiple screening/monitoring modules, this new key information may be communicated by the detecting module to some or all of the other screening/monitoring modules in the system.

Figure 8:
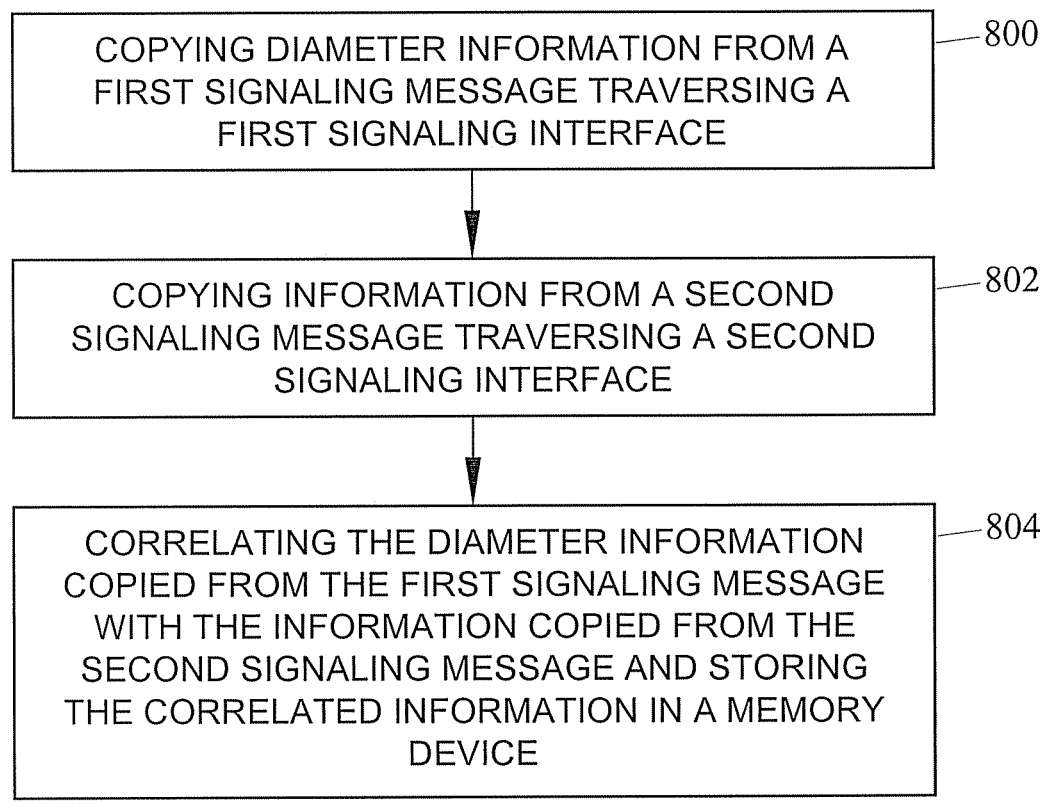
FIG. 8 is a flow chart illustrating exemplary steps for providing integrated monitoring information according to an embodiment of the subject matter described herein.

FIG. 8 is a flow chart illustrating exemplary steps for providing integrated monitoring information according to an embodiment of the subject matter described herein. In one embodiment, one or more exemplary steps described herein may be performed at or performed by a Diameter node 100, e.g., a DSR. In another embodiment, one or more exemplary steps described herein may be performed at or performed by a data collection platform 300, e.g., a stand-alone monitoring system using monitoring probes. In yet another embodiment, one or more exemplary steps described herein may be performed at or performed by a Diameter signaling gateway 600, e.g., a multi-protocol signaling router and/or gateway.

Referring to the embodiment illustrated in FIG. 8, at step 800, Diameter information from a first signaling message traversing a first signaling interface may be copied. For example, Diameter node 100 (e.g., a DSR) may receive a Diameter signaling message from MME 112 via Diameter S11 interface 122 and may copy AVP information from the message.

In one embodiment, the portion of the first Diameter message included in the monitoring record comprises at least one of: a parameter, a subscriber identifier, a device identifier, an international mobile station identifier (IMSI), a mobile subscriber integrated services digital network (MSISDN) number, a short code, a uniform resource identifier (URI), an international mobile equipment identifier (IMEI), a mobile identification number (MIN), an Auth-Session-State parameter, a Origin-Host parameter, a Origin-Realm parameter, a Destination-Host parameter, a Destination-Realm parameter, a User-Name parameter, a Supported-Features parameter, a Terminal-Information parameter, a RAT-Type parameter, a ULR-Flags parameter, a Visited-PLMN-Id parameter, a SGSN-Number parameter, a AVP parameter, a Proxy-Info parameter, and a Route-Record parameter.

At step 802, information from a second signaling message traversing a second signaling interface may be copied. Continuing from the example stated above, Diameter node 100 may receive a SIP signaling message from MME 112 via SIP interface 406 and may copy information from the SIP message.

In one embodiment, the first and second signaling messages may each comprise a Diameter signaling message. In another embodiment, the first signaling message may comprise a Diameter signaling message and the second signaling message may comprise a non-Diameter signaling message At step 804, the Diameter information copied from the first signaling message with the information copied from the second signaling message may be correlated and the correlated information may be stored in a memory device. Continuing from the example stated above, Diameter node 100, or monitoring module 206, may correlate the first Diameter message and the second message. For example, Diameter node 100 may determine, by examining the two messages, that the messages are associated and that a particular event occurred (e.g., each message may be associated with mobile subscriber 'A' and may be related to mobile subscriber 'A' roaming on a different operator's network). Diameter node 100 may generate a record (e.g., a CDR or SDR) that includes Diameter information from the first signaling message and information from the second signaling message. The record may be stored in a billings database and may be used for determining roaming expenses or other purposes.

It will be appreciated that the above examples are illustrative and that the functionality described herein may implemented for use with or applicable for various signaling messages, various signaling interfaces and various signaling nodes, including messages, interfaces, and nodes not explicitly described above, without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for multi-interface monitoring and correlation of Diameter information, the system comprising:
    a first screening module for copying Diameter information from a first signaling message traversing a first signaling interface;
    a second screening module for copying information from a second signaling message traversing a second signaling interface;
    a correlation module for correlating the Diameter information copied from the first signaling message with the information copied from the second signaling message and storing the correlated information in a memory device; and
    a Diameter node for performing at least one Diameter function, wherein the screening modules are components of the Diameter node, wherein the Diameter node comprises a Diameter signaling router (DSR), wherein the DSR includes a plurality of message processors for routing Diameter signaling messages, wherein the correlation module is implemented on each of the message processors and shares Diameter message correlation capability with routing functionality of the message processors.

2. The system of claim 1 wherein the first and second signaling messages each comprise a Diameter signaling message.

3. The system of claim 1 wherein the first signaling message comprises a Diameter signaling message and the second signaling message comprises a non-Diameter signaling message.

4. The system of claim 1 wherein the correlation module implemented on each message processor is adapted to correlate a set of messages relating to a Diameter transaction and to communicate a single message including the correlated set to a monitoring module.

5. The system of claim 1 wherein the Diameter node comprises a Diameter signaling gateway.

6. The system of claim 1 comprising a stand-alone data collection platform, wherein the screening modules and the correlation modules utilize the stand-alone data collection platform.

7. The system of claim 6 wherein the stand-alone data collection platform includes link probes, wherein additional screening modules are components of the link probes.

8. The system of claim 6 wherein the stand-alone data collection platform includes link probes, wherein the screening modules are separate from the link probes and the screening modules screen signaling messages copied by the link probes.

9. The system of claim 1 wherein the correlation module is configured to make the correlated information available to at least one application.

10. The system of claim 9 wherein the at least one application includes one of a fraud detection application, a billing application, a charging data function, and a roaming verification application.

11. The system of claim 1 comprising a communications detail record (CDR) or session detail record (SDR) generator module for generating a CDR or SDR containing Diameter information from the first signaling message and information from the second signaling message.

12. The system of claim 1 comprising a monitoring module for providing screening rules to the screening modules, wherein the screening rules screen Diameter signaling messages using the screening rules.

13. The system of claim 12 wherein the monitoring module provides a first screening rule to a first screening module, the first screening module detects a first message based on the first screening rule and sends information regarding the first message to the monitoring module, and wherein the monitoring module uses the information regarding to the first message to formulate and send a second screening rule to the first screening module.

14. A method for multi-interface monitoring and correlation of Diameter information, the method comprising:
    copying, by a first screening module, Diameter information from a first signaling message traversing a first signaling interface;
    copying, by a second screening module, information from a second signaling message traversing a second signaling interface; and
    correlating, by a correlation module, the Diameter information copied from the first signaling message with the information copied from the second signaling message and storing the correlated information in a memory device,
    wherein the screening modules are components of a Diameter node for performing at least one Diameter function, wherein the Diameter node comprises a Diameter signaling router (DSR), wherein the DSR includes a plurality of message processors for routing Diameter signaling messages, and wherein the correlation module is implemented on each of the message processors and shares Diameter message correlation capability with routing functionality of the message processors.

15. The method of claim 14 wherein the first and second signaling messages each comprise a Diameter signaling message.

16. The method of claim 14 wherein the first signaling message comprises a Diameter signaling message and the second signaling message comprises a non-Diameter signaling message.

17. The method of claim 14 wherein the Diameter node comprises a Diameter signaling gateway.

18. The method of claim 14 wherein copying information from the signaling messages and correlating the Diameter information copied from the first signaling message with the information copied from the second signaling message are performed using a stand-alone data collection platform.

19. The method of claim 18 wherein copying information from the signaling messages is performed by one or more link probes.

20. The method of claim 18 wherein copying information from the signaling messages is performed separately from the link probes and wherein the information copied is from signaling messages copied by the link probes.

21. The method of claim 14 comprising making the correlated information available to at least one application.

22. The method of claim 21 wherein the at least one application includes one of a fraud detection application, a billing application, a charging data function, and a roaming verification application.

23. The method of claim 14 comprising generating a call detail record (CDR) or session detail record (SDR) containing the Diameter information from the first signaling message and the information from the second signaling message.

24. A non-transitory computer readable medium having stored thereon executable instructions that when executed by the processor of a computer control the computer to perform steps comprising:

copying, by a first screening module, Diameter information from a first signaling message traversing a first signaling interface;

copying, by a second screening module, information from a second signaling message traversing a second signaling interface; and correlating, by a correlation module, the Diameter information copied from the first signaling message with the information copied from the second signaling message and storing the correlated information in a memory device, wherein the screening modules are components of a Diameter node for performing at least one Diameter function, wherein the Diameter node comprises a Diameter signaling router (DSR), wherein the DSR includes a plurality of message processors for routing Diameter signaling messages, and wherein the correlation module is implemented on each of the message processors and shares Diameter message correlation capability with routing functionality of the message processors.

\* \* \* \* \*